(12) United States Patent
Oike et al.

(10) Patent No.: US 12,544,955 B2
(45) Date of Patent: Feb. 10, 2026

(54) RESIN-MADE CONTAINER MANUFACTURING METHOD, MANUFACTURING DEVICE, AND METAL MOLD UNIT

(71) Applicant: NISSEI ASB MACHINE CO., LTD., Nagano (JP)

(72) Inventors: Toshiteru Oike, Nagano (JP); Yoichi Tsuchiya, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 734 days.

(21) Appl. No.: 17/792,257

(22) PCT Filed: Jan. 12, 2021

(86) PCT No.: PCT/JP2021/000722
§ 371 (c)(1),
(2) Date: Jul. 12, 2022

(87) PCT Pub. No.: WO2021/145314
PCT Pub. Date: Jul. 22, 2021

(65) Prior Publication Data
US 2023/0084023 A1     Mar. 16, 2023

(30) Foreign Application Priority Data

Jan. 14, 2020   (JP) ................................. 2020-003915

(51) Int. Cl.
*B29B 11/08*   (2006.01)
*B29C 45/16*   (2006.01)
(Continued)

(52) U.S. Cl.
CPC .......... *B29B 11/08* (2013.01); *B29C 45/1625* (2013.01); *B29C 45/1684* (2013.01);
(Continued)

(58) Field of Classification Search
None
See application file for complete search history.

(56) References Cited

U.S. PATENT DOCUMENTS 4,307,137 A    12/1981  Ota et al.
6,649,121 B1 * 11/2003  Hamamoto ......... B29C 45/1684
                                              264/513
(Continued)

FOREIGN PATENT DOCUMENTS

JP     1980-142623    11/1980
JP     62-57488 B2    12/1987
(Continued)

OTHER PUBLICATIONS

International Search Report and Written Opinion of the International Searching Authority issued in International Patent Application No. PCT/JP2021/000722, dated Mar. 23, 2021, along with an English translation thereof.

(Continued)

*Primary Examiner* — Yan Lan
(74) *Attorney, Agent, or Firm* — Greenblum & Bernstein, P.L.C.

(57) ABSTRACT

A manufacturing method of a resin container includes: a first injection molding process for injection-molding a first layer of a preform by using a first resin material, the preform having a bottomed cylindrical shape and including a groove that extends in an axis direction; a second injection molding process for injecting a second resin material into the groove of the first layer, the second resin material having a color that is different from a color of the first resin material, and laminating a second layer on an outer peripheral side or an inner peripheral side of the first layer; and a blow-molding process for blow-molding a preform that includes multiple layers and has been obtained in the second injection molding process in a state where residual heat at a time of injection (Continued)

molding is contained, and manufacturing the resin container having a vertical-striped color pattern formed by using the second layer.

4 Claims, 9 Drawing Sheets

(51) Int. Cl.
    *B29C 45/26*     (2006.01)
    *B29C 49/00*     (2006.01)
    *B29C 49/06*     (2006.01)
    *B29C 49/22*     (2006.01)
    *B29C 49/02*     (2006.01)
    *B29L 31/00*     (2006.01)

(52) U.S. Cl.
    CPC ............ *B29C 45/26* (2013.01); *B29C 49/062* (2013.01); *B29C 49/071* (2022.05); *B29C 49/22* (2013.01); *B29C 2049/023* (2013.01); *B29C 2049/222* (2013.01); *B29C 2949/0715* (2022.05); *B29C 2949/0741* (2022.05); *B29C 2949/0769* (2022.05); *B29C 2949/077* (2022.05); *B29C 2949/0781* (2022.05); *B29C 2949/22* (2022.05); *B29C 2949/3034* (2022.05); *B29C 2949/3088* (2022.05); *B29K 2995/0021* (2013.01); *B29L 2031/712* (2013.01); *B29L 2031/716* (2013.01)

(56) References Cited

U.S. PATENT DOCUMENTS

| | | | |
|---|---|---|---|
| 8,486,501 B2 * | 7/2013 | Manabe | B65D 1/095 |
| | | | 215/47 |
| 9,610,724 B2 | 4/2017 | Yama et al. | |
| 11,260,575 B2 | 3/2022 | Kawamur et al. | |
| 2012/0328814 A1 | 12/2012 | Atance Orden et al. | |
| 2019/0337218 A1 | 11/2019 | Kawamur | |

FOREIGN PATENT DOCUMENTS

| | | | |
|---|---|---|---|
| JP | H11-090975 | | 4/1999 |
| JP | 2001-105478 | | 4/2001 |
| JP | 4953178 | B2 | 6/2012 |
| JP | 5765656 | B2 | 8/2015 |
| JP | 6058484 | B2 | 1/2017 |
| JP | 6058485 | B2 | 1/2017 |
| JP | 2019-147393 | A | 9/2019 |
| WO | WO97/13696 | * | 10/1996 |

OTHER PUBLICATIONS

Office Action dated Nov. 8, 2024 in Korean family member application No. 10-2022-7026997 with English language translation thereof.

Office Action issued Apr. 15, 2023 in Chinese family member application No. 202180009209.2 and English translation thereof.

Office Action issued Jun. 6, 2023 in Japanese family member application No. 2021-571189 and English language translation thereof.

Office Action, dated Jul. 16, 2025, in Korean family member application No. 10-2022-7026997, with English language (machine) translation thereof.

* cited by examiner

RESIN-MADE CONTAINER MANUFACTURING METHOD, MANUFACTURING DEVICE, AND METAL MOLD UNIT

BACKGROUND OF THE INVENTION

Field of the Invention

The present invention relates to a manufacturing method, a manufacturing apparatus, and a mold unit of a resin container.

Description of the Related Art

It is requested that containers that accommodate cosmetics, milky lotion, or the like have the visually attractive appearance of the containers themselves, in order to enhance the buying intention of consumers. As this type of containers that accommodate cosmetics or the like, a bottle that is made of glass, creates luxurious feeling or massive feeling, and can maintain a beautiful state in repetitive use has been preferably used. In addition, in order to improve the esthetic appearance of containers, it is desired that a vertical-striped pattern be applied to containers that accommodate cosmetics or the like, by performing internal coloring.

Meanwhile, bottles made of glass are heavy and fragile, and also have a high transportation cost or manufacturing cost. Therefore, it has been considered that as containers that accommodate cosmetics or the like, a bottle made of glass is replaced with a resin container.

As one example of a manufacturing method of a resin container, a hot parison blow-molding method is conventionally known. In the hot parison blow-molding method, a resin container is blow-molded by using residual heat at the time of injection molding of a preform. Therefore, there is an advantage in which a variety of resin containers that have excellent esthetic appearance can be manufactured in comparison with a cold parison method.

For example, JP 4953178 B2, JP 5765656 B2, JP 6058484 B2 and JP 6058485 B2 disclose a configuration in which a gas barrier resin having a longitudinal belt shape is disposed in parallel in a circumferential direction as an intermediate layer of a PET resin container in order to improve a gas barrier property of the container. In this technology of JP 4953178 B2, two types of resin are merged in a multiple nozzle, a cavity of a mold is filled with the two types of resin, and a laminated preform is molded.

Meanwhile, in the technologies of JP 4953178 B2, JP 5765656 B2, JP 6058484 B2 and JP 6058485 B2, in practice, it is very difficult to simultaneously inject plural types of resin and precisely control a width, a position, and a shape of an intermediate layer. In addition, a configuration of an injection molding apparatus is complicated and expensive. Therefore, the technology of JP 4953178 B2 is not necessarily suitable for the purpose of stably forming a vertical-striped color pattern in a container after blow-molding, by performing internal coloring.

SUMMARY OF THE INVENTION

A manufacturing method of a resin container in one aspect of the present invention includes: a first injection molding process for injection-molding a first layer of a preform by using a first resin material, the preform having a bottomed cylindrical shape and including a groove that extends in an axis direction; a second injection molding process for injecting a second resin material into the groove of the first layer, the second resin material having a color that is different from a color of the first resin material, and laminating a second layer on an outer peripheral side or an inner peripheral side of the first layer; and a blow-molding process for blow-molding a preform that includes multiple layers and has been obtained in the second injection molding process in a state where residual heat at a time of injection molding is contained, and manufacturing the resin container having a vertical-striped color pattern formed by using the second layer.

Further features of the present invention will become apparent from the following description of exemplary embodiments with reference to the attached drawings.

DESCRIPTION OF THE EMBODIMENTS

Embodiments of the present invention are described below with reference to the drawings. In the embodiments, in order to make description easily understandable, description is provided in a state where a structure or elements other than a principal portion of the present invention are simplified or omitted. In addition, in the drawings, the same element is denoted by the same reference sign. Note that a shape, a size, or the like of each element in the drawings is schematically illustrated, and does not indicate an actual shape, size, or the like.

<Configuration Examples of Preform>

First, configuration examples of a preform having a multilayer structure according to the present embodiment are described with reference to FIGS. 1A to 1D.

Figure 1:
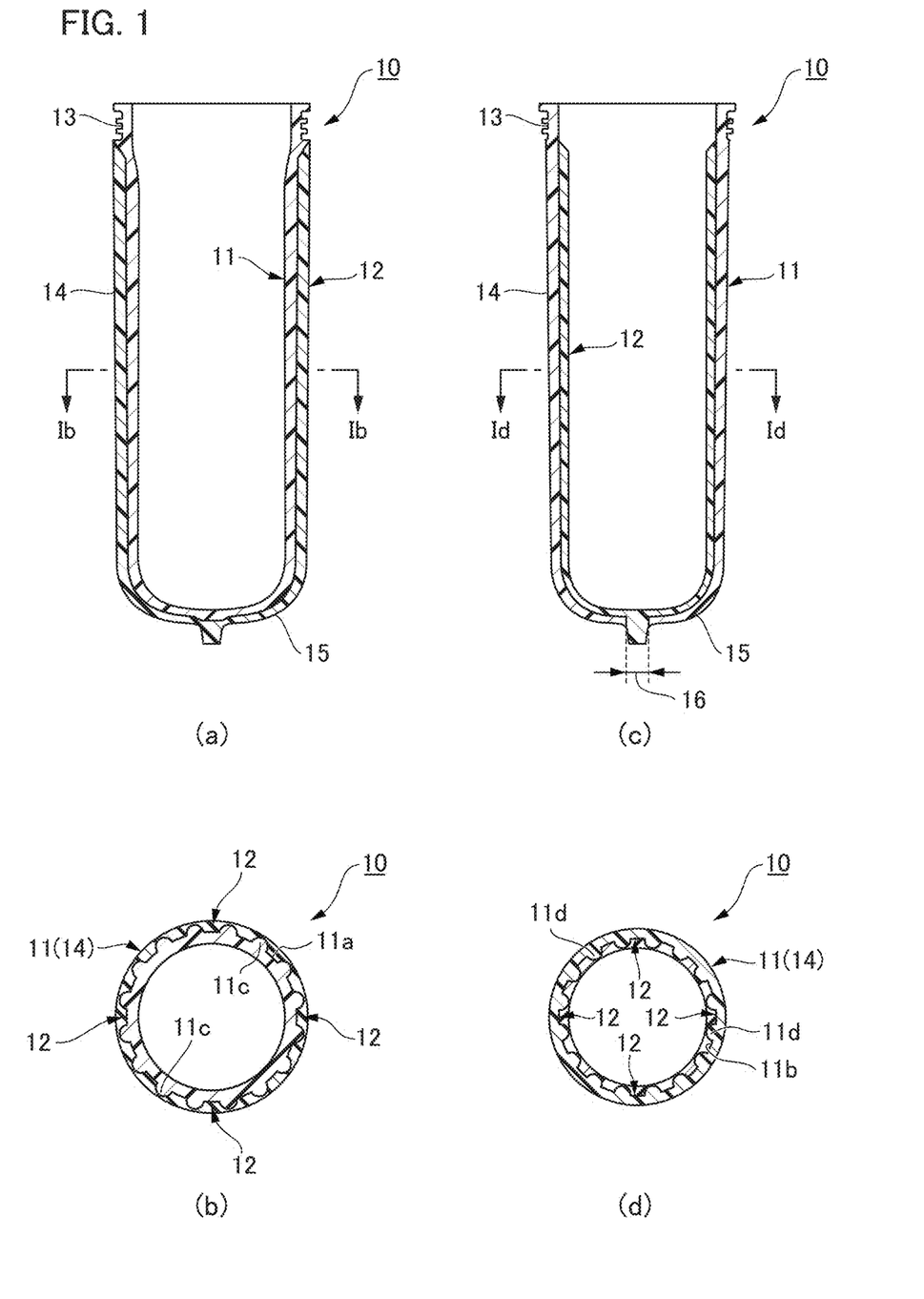
FIGS. 1A to 1D are sectional views of preforms having a multilayer structure according to the present embodiment.

FIG. 1A is a vertical sectional view of a preform 10 in a first example of the present embodiment, and FIG. 1B is a sectional view taken along line Ib-Ib of FIG. 1A. FIG. 1C is a vertical sectional view of a preform 10 in a second example of the present embodiment, and FIG. 1D is a sectional view taken along line Id-Id of FIG. 1C.

Both the entire shapes of the preforms 10 in the first example and the second example illustrated in FIGS. 1A to 1D are a bottomed cylindrical shape in which one end side is open and another end side is closed. These preforms 10 include a first layer that includes a barrel 14 that has been formed in a cylindrical shape, a bottom 15 that closes the other end side of the barrel 14, and a neck 13 that has been formed in an opening on the one side of the barrel 14. In addition, these preforms have a multilayer structure in which a second layer 12 has been laminated on a first layer 11. The first layer 11 and the second layer 12 that have been described above are formed by performing two stages of injection molding, as described later.

As illustrated in FIGS. 1A and 1B, in the preform 10 in the first example, a plurality of grooves 11*a* that each extends along an axis direction has been formed on an outer peripheral side of the first layer 11. The grooves 11*a* of the first layer 11 are disposed at equal intervals in a circumferential direction, and therefore a transverse cross section of the first layer 11 illustrated in FIG. 1B forms an external gear shape. Then, in each of the grooves 11*a* on the outer peripheral side of the first layer 11, the second layer 12 has been formed in such a way that a space of each of the grooves 11*a* is filled.

In contrast, as illustrated in FIGS. 1C and 1D, in the preform 10 in the second example, a plurality of grooves 11*b* that each extends along the axis direction has been formed on an inner peripheral side of the first layer 11. The grooves 11*b* of the first layer 11 are disposed at equal intervals in the circumferential direction, and therefore a transverse cross section of the first layer illustrated in FIG. 1D forms an internal gear shape. Then, in each of the grooves 11*b* on the inner peripheral side of the first layer 11, the second layer 12 has been formed in such a way that a space of each of the grooves 11*b* is filled. In addition, as illustrated in FIG. 1C, in the preform 10 in the second example, a hole 16 has been formed in a center of a bottom of the first layer 11, and the hole 16 of the first layer 11 is closed from an inside by the second layer 12.

Note that the specifications, such as a shape or a size, of the first layer 11 and the second layer 12 are appropriately adjusted according to a shape of a container to be manufactured, a color pattern to be formed in the container, or the like.

Hereinafter, a resin material that is used to form the first layer 11 is also referred to as a first resin material, and a resin material that is used to form the second layer 12 is also referred to as a second material.

Both the first resin material and the second resin material are a thermoplastic synthetic resin, and can be appropriately selected according to the specifications of a container. Specific examples of a type of material include polyethylene terephthalate (PET), polyethylene naphthalate (PEN), polycyclohexanedimethylene terephthalate (PCTA), Tritan (registered trademark) (copolyester from Eastman Chemical Company), polypropylene (PP), polyethylene (PE), polycarbonate (PC), polyethersulfone (PES), polyphenylsulfone (PPSU), polystyrene (PS), cyclic olefin polymer (COP/COC), polymethyl methacrylate (PMMA: acryl), polylactic acid (PLA), nylon, and the like. An additive such as colorant can be appropriately added to these resin materials.

In addition, in each of the preforms 10 described above, resin materials that are different in color are employed in the first layer 11 and the second layer 12. For example, the first resin material and the second resin material are different in an amount of colorant (a shade of color) or a type of colorant (a type of color). Colorant does not need to be added to one of the first resin material and the second resin material.

In addition, both or at least one of the first layer 11 and the second layer 12, for example, a layer including a portion that faces an outer periphery, may have a property that allows light to pass through (a light transmissive property). Note that a layer having the light transmissive property may be colored. The present embodiment is described under the assumption that the first resin material is transparent (has the light transmissive property).

In addition, a combination of the first resin material and the second material can be appropriately set according to the specifications of a container, and it is preferable that materials having high mutual weldability be combined. As an example, the first resin material and the second resin material may be resin materials that have different compositions of colorant and are of the same type (for example, PETs).

<Configuration Examples of Resin Container>

Next, configuration examples of a resin container (hereinafter also simply referred to as a container) according to the present embodiment are described with reference to FIGS. 2A to 2D.

Figure 2:
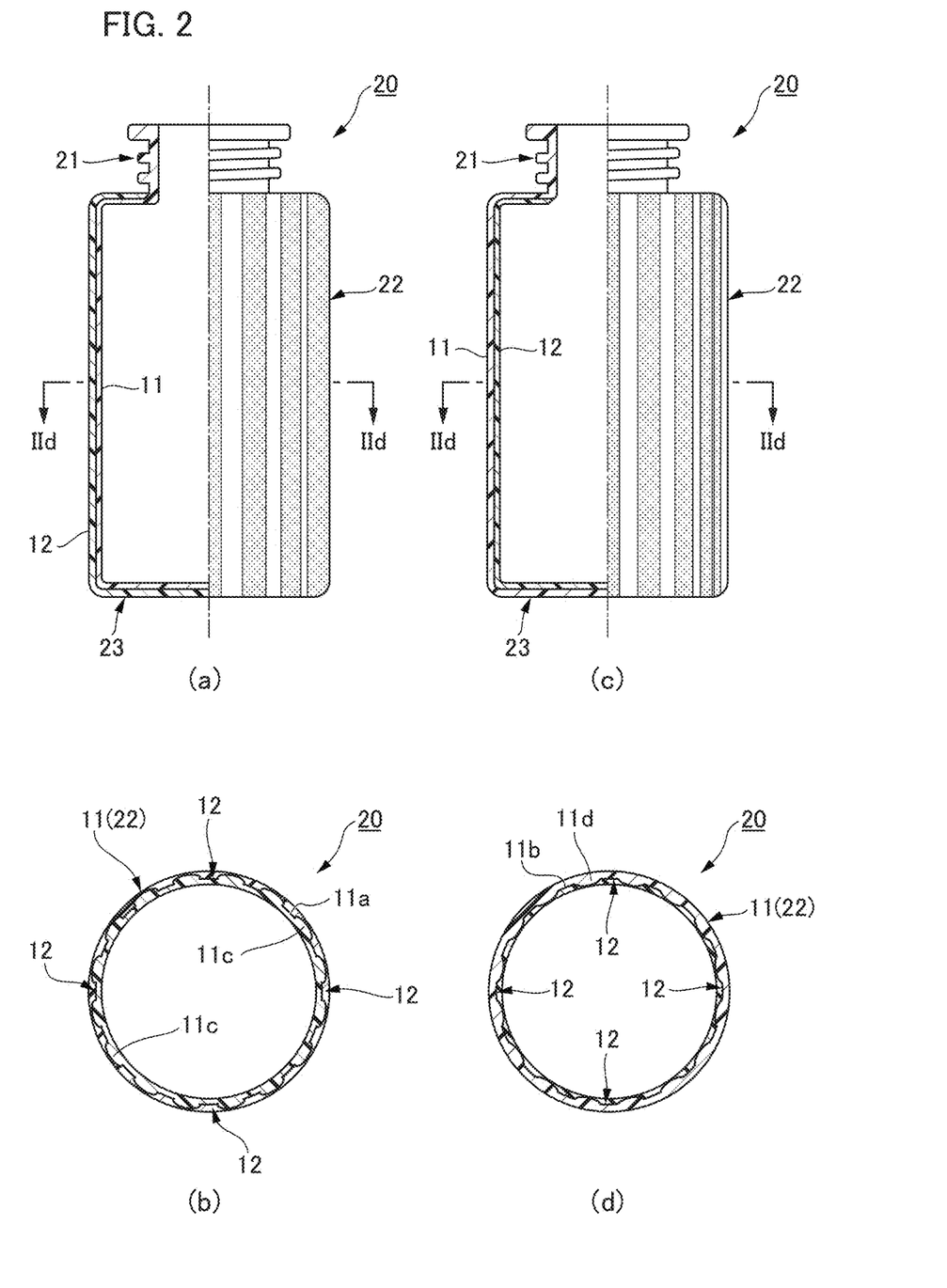
FIGS. 2A to 2D are diagrams illustrating examples of a resin container according to the present embodiment.

FIG. 2A is a diagram illustrating an example of a container 20 obtained by blow-molding the preform 10 in the first example, and FIG. 2B is a sectional view taken along line IIb-IIb of FIG. 2A. FIG. 2C is a diagram illustrating an example of a container 20 obtained by blow-molding the preform 10 in the second example, and FIG. 2D is a sectional view taken along line IId-IId of FIG. 2C. In each of FIGS. 2A and 2C, a right half portion of the drawing illustrates the appearance of the container 20, and a left half portion of the drawing illustrates a vertical cross section of the container 20.

In the containers 20 illustrated in FIGS. 2A and 2C, for example, toner, milky lotion, or the like is accommodated. The container 20 includes a neck 21 that includes an opening at an upper end, a barrel 22 that continuously extends from the neck 21 and has a cylindrical shape, and a bottom 23 that continuously extends from the barrel 22.

In each of the barrels 22 of these containers 20, a color pattern that extends along the axis direction has been formed in a striped shape in the circumferential direction. By applying decoration having such a pattern, the esthetic appearance of the container 20 is improved, and the buying intention of consumers can be further enhanced in the use as a cosmetic container or the like.

The color pattern of the container 20 according to the present embodiment is formed according to a thickness distribution of the first layer 11 and the second layer 12.

In the circumferential direction of the container 20, a portion other than the grooves 11*a* and 11*b* of the first layer 11 (a portion of ridges 11*c* and 11*d*) has been formed to roughly only include the first layer 11 (to have a higher ratio of the first layer 11), and therefore the color of the first layer 11 appears.

On the other hand, in the circumferential direction of the container 20, the second layer 12 has been laminated in a portion of each of the grooves 11*a* and 11*b* of the first layer 11. Therefore, in the portion of the grooves 11*a* and 11*b* of the first layer 11, the color of the second layer 12 that is located in an outer periphery appears in the case of FIGS. 2A and 2B, or the color of the second layer 12 on an inner layer side appears through the first layer 11 in the case of in FIGS. 2C and 2D.

Note that the barrel 22 of the container 20 may be formed to have a thickness that is much smaller than the thickness of the bottom 23, and the barrel 22 may have a uniform thickness distribution. If the container 20 is formed to have a shape having the thickness distribution described above, luxurious feeling or massive feeling is emphasized, and the container 20 can be made closer to a consumer's impression of a cosmetic container.

<Description of Container Manufacturing Apparatus>

Figure 3:
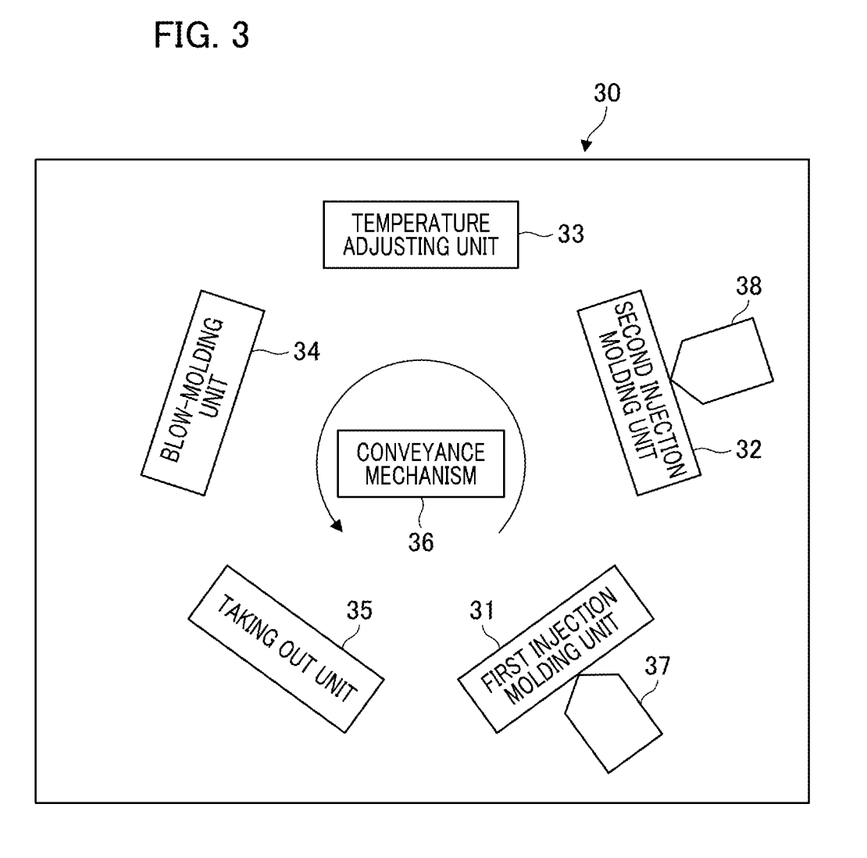
FIG. 3 is a diagram schematically illustrating a configuration of a blow-molding apparatus according to the present embodiment.

FIG. 3 is a diagram schematically illustrating a configuration of a blow-molding apparatus according to the present embodiment. A blow-molding apparatus 30 according to the present embodiment is an example of a container manufacturing apparatus, and employs a hot parison method (also referred to as a one-stage method) for blow-molding the container 20 by utilizing residual heat (a quantity of internal heat) at the time of injection molding without cooling down the preform 10 to room temperature.

The blow-molding apparatus 30 includes a first injection molding unit 31, a second includes molding unit 32, a temperature adjusting unit 33, a blow-molding unit 34, a taking out unit 35, and a conveyance mechanism 36. The first injection molding unit 31, the second injection molding unit 32, the temperature adjusting unit 33, the blow-molding unit 34, and the taking out unit 35 are disposed in positions that have been displaced in a rotating manner by every predetermined angle (for example, every 72 degrees) with the conveyance mechanism 36 as a center.

(Conveyance Mechanism 36)

The conveyance mechanism 36 includes a transfer plate (not illustrated in FIG. 3) that rotates about an axis in a sheet vertical direction in FIG. 3 as a center. On the transfer plate, a neck mold 36a (not illustrated in FIG. 3) that holds the neck 13 of the preform 10 (or the neck 21 of the container 20) is disposed. In a case where the transfer plate includes a single roughly disk-shaped member, one or more neck molds 36a are disposed at every predetermined angle. In a case where the transfer plate includes roughly fan-shaped members that have been divided for respective molding units, one or more neck molds 36a are disposed for each of the divided transfer plates.

The conveyance mechanism 36 rotates the transfer plate, and therefore the conveyance mechanism 36 conveys the preform 10 (or the container 20) in which a neck is held by the neck mold 36a to the first injection molding unit 31, the second injection molding unit 32, the temperature adjusting unit 33, the blow-molding unit 34, and the taking out unit 35 in this order. Accordingly, each of the neck molds 36a is shared by a plurality of molding stations (at least the first injection molding unit 31 and the second injection molding unit 32). In addition, a tapered part 36a1 has been formed on an outside face (or an inside face) of the neck mold 36a. The tapered part 36a1 comes into contact with or is fitted into a mold of each of the molding stations, and therefore a relative positional relationship between both parts at the time of molding can be regulated. Note that the conveyance mechanism 36 can also elevate or lower the transfer plate, and also performs an operation relating to mold closing or mold opening (mold releasing) in the first injection molding unit 31 or the second injection molding unit 32.

(First Injection Molding Unit 31)

The first injection molding unit 31 includes a mold for first injection molding that includes a cavity mold 40, a core mold 41, and a hot runner mold 42, and manufactures the first layer 11 of the preform 10. The first injection molding unit 31 is connected to a first injection device 37 that supplies the first resin material to the hot runner mold 42. The cavity mold 40 includes a fitting part (a concavo-convex part for fitting and a position regulation part) 40b on a face on an opposite side of a face that faces the hot runner mold 42 (see FIG. 4A and FIGS. 5A and 5B). The fitting part 40b includes a tapered part 40b1 having a shape that is roughly similar to a shape of the tapered part 36a1 of the neck mold 36a, and receives the tapered part 36a1 of the neck mold 36a by using the tapered part 40b1.

Figure 4:
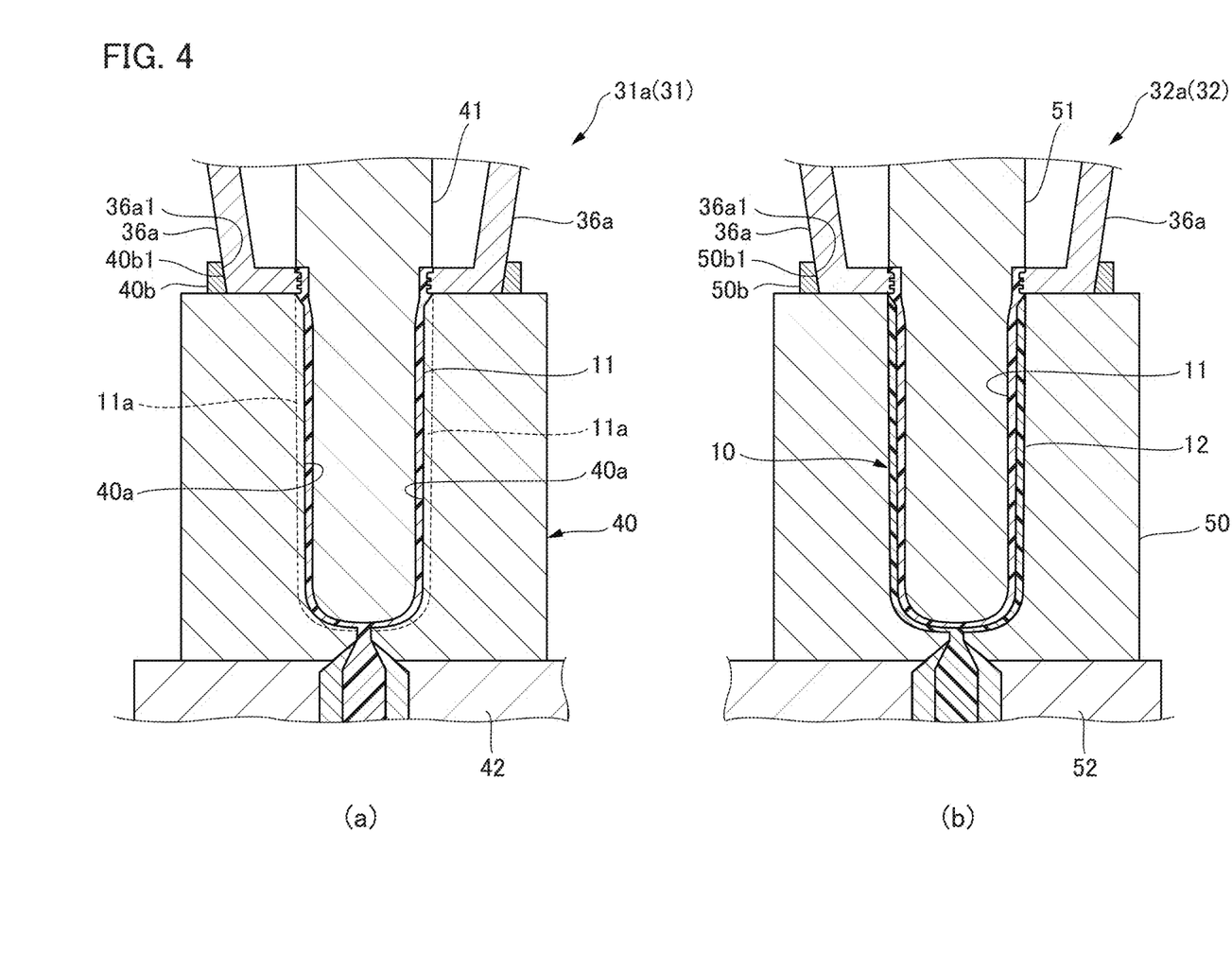
FIGS. 4A and 4B are diagrams illustrating a process of manufacturing a preform in a first example.
Figure 5:
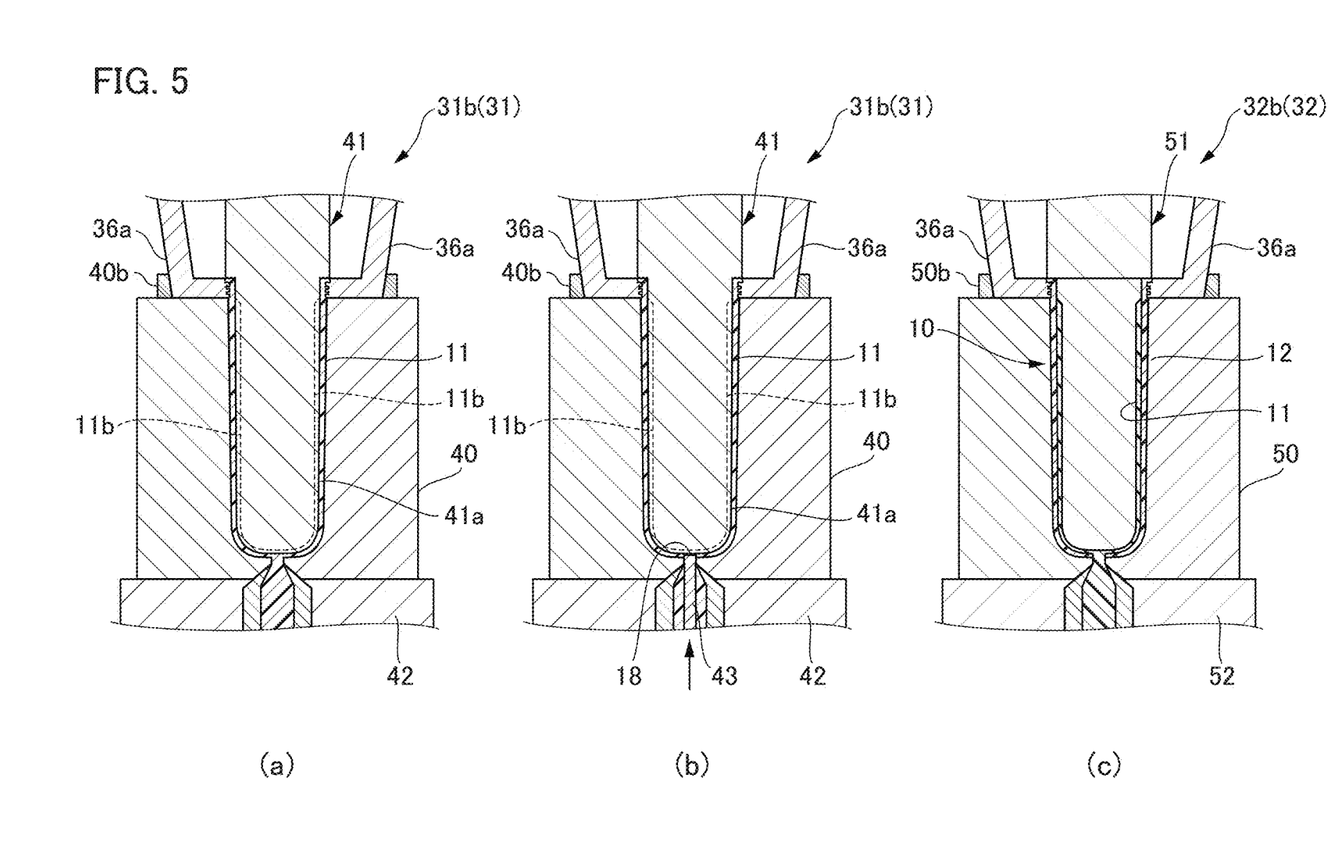
FIGS. 5A to 5C are diagrams illustrating a process of manufacturing a preform in a second example.

FIG. 4A illustrates a first injection molding unit 31a that molds the first layer 11 of the preform 10 in the first example (FIG. 1A). FIGS. 5A and 5B illustrate a first injection molding unit 31b that molds the first layer 11 of the preform 10 in the second example (FIG. 1C). Note that herein, when the first injection molding units 31a and 31b do not need to be distinguished from each other, the first injection molding unit 31 is used as a generic term.

As illustrated in FIG. 4A and FIG. 5A, in the first injection molding unit 31, mold closing is performed on the cavity mold 40, the core mold 41, and the neck mold 36a of the conveyance mechanism 36 that have been described above, and a mold space (a molding space) of the first layer 11 is formed.

The cavity mold 40 illustrated in FIG. 4A specifies an outer peripheral shape of an inner layer (the first layer 11) of the preform 10. The core mold 41 illustrated in FIG. 4A is inserted into the cavity mold 40, and specifies an inner peripheral shape of the inner layer.

On the other hand, the cavity mold 40 illustrated in FIG. 5A or 5B specifies an outer peripheral shape of an outer layer (the first layer 11) of the preform 10. The core mold 41 illustrated in FIG. 5A or 5B is inserted into the cavity mold 40, and specifies an inner peripheral shape of the outer layer.

Then, the first resin material is poured into the mold space described above through the hot runner mold 42 from the first injection device 37, and therefore the first layer 11 of the preform 10 is manufactured in the first injection molding unit 31.

Here, on an inner face of the cavity mold 40 of the first injection molding unit 31a, protrusions 40a that extend along the axis direction are formed at equal intervals in the circumferential direction, and the inner face of the cavity mold 40 forms an internal gear shape, but this is not illustrated. Each of the protrusions 40a of this cavity mold 40 has a shape that corresponds to the groove 11a of the first layer 11, and by using the cavity mold 40 described above, the grooves 11a and the ridges (narrow and long protrusions) 11c that each extend in the axis direction are formed in an outer periphery of the first layer 11, as illustrated in FIG. 1B.

On the other hand, on a surface of the core mold 41 of the first injection molding unit 31b, protrusions 41a that extend along the axis direction are formed at equal intervals in the circumferential direction, and a transverse cross section of the core mold 41 forms an external gear shape, but this is not illustrated. Each of the protrusions 41a of this core mold 41 has a shape that corresponds to the groove 11b of the first layer, and by using the core mold 41 described above, the grooves 11b and the ridges 11d that each extend in the axis direction are formed in an inner periphery of the first layer 11, as illustrated in FIG. 1D.

Note that FIGS. 5A and 5B illustrate a vertical cross section of a portion of the protrusion 41a of the core mold 41.

In addition, as illustrated in FIG. 5B, in the first injection molding unit 31b, a valve pin 43 that can move in the axis direction to a position close to the core mold 41 is provided in the interior of the hot runner mold 42. The valve pin 43 is accommodated in the interior of the hot runner mold 42 until the mold space is filled with the first resin material, and the valve pin 43 protrudes to a position close to the core mold 41 after the mold space has been filled with the first resin material. The valve pin 43 moves at the time of injection molding, as described above, and therefore a thin film 18 in which the thickness of a resin material is smaller than the thickness of a peripheral part can be formed in a center of the bottom of the first layer 11.

In addition, even when mold opening has been performed on the first injection molding unit 31, the neck mold 36a of the conveyance mechanism 36 is not opened, and in this state, the first layer 11 of the preform 10 is held and conveyed. The number of preforms 10 to be simultaneously molded by the first injection molding unit 31 (that is, the number of containers 20 that can be simultaneously molded by the blow-molding apparatus 30) can be appropriately set.

(Second Injection Molding Unit 32)

The second injection molding unit 32 includes a mold for second injection molding that includes a cavity mold 50, a core mold 51, and a hot runner mold 52, and the second injection molding unit 32 injection-molds the second layer 12 in an outer peripheral part or an inner peripheral part of the first layer 11. The second injection molding unit 32 is connected to a second injection device 38 that supplies the second resin material to the hot runner mold 52. In addition, the cavity mold 50 includes a fitting part (a position regulation part) 50b on a face on an opposite side of a face that faces the hot runner mold 52 (see FIG. 4B and FIG. 5C). The fitting part 50b includes a tapered part 50b1 having a shape that is roughly similar to a shape of the tapered part 36a1 of the neck mold 36a, and receives the tapered part 36a1 of the neck mold 36a by using the tapered part 50b1.

FIG. 4B illustrates a second injection molding unit 32a that molds the second layer 12 of the preform 10 in the first example (FIG. 1A). FIG. 5C illustrates a second injection molding unit 32b that molds the second layer 12 of the preform 10 in the second example (FIG. 1C). Note that herein, when the second injection molding units 32a and 32b do not need to be distinguished from each other, the second injection molding unit 32 is used as a generic term.

The second injection molding unit 32a accommodates the first layer 11 of the preform 10 that has been injection-molded by the first injection molding unit 31a. As illustrated in FIG. 4B, in a state where mold closing has been performed on the second injection molding unit 32a, a mold space is formed between a portion from the barrel to the bottom of the outer peripheral side of the first layer 11 and an inner face of the cavity mold 50.

The core mold 51 illustrated in FIG. 4B is inserted into an inner layer (the first layer 11) of the preform 10, and holds the inner layer from the inside. The cavity mold 50 illustrated in FIG. 4B receives the inner layer into which the core mold 51 will be inserted, forms a mold space of an outer layer (the second layer 12) between the cavity mold 50 and an outer peripheral face of the inner layer, and specifies an outer peripheral shape of the outer layer.

The mold space described above is filled with the second resin material from the second injection device 38 by using the hot runner mold 52, and therefore the second layer 12 is formed in each of the portions of the grooves 11a of the first layer 11. By doing this, the preform 10 in the first example is manufactured.

The second injection molding unit 32b accommodates the first layer 11 of the preform 10 that has been injection-molded by the first injection molding unit 31b. As illustrated in FIG. 5C, in a state where mold closing has been performed on the second injection molding unit 32b, a mold space is formed between the grooves 11b on the inner peripheral side of the first layer 11 and a surface of the core mold 51.

The cavity mold 50 illustrated in FIG. 5C receives an outer layer (the first layer 11) of the preform 10, and holds the outer layer from the outside. The core mold 51 illustrated in FIG. 5C is inserted into an inside of the outer layer, forms a mold space of an inner layer (the second layer 12) between the core mold 51 and an inner peripheral face of the outer layer, and specifies an inner peripheral shape of the inner layer.

The second injection device 38 fills the mold space described above with the second resin material by using the hot runner mold 52, and therefore the second layer 12 is formed in each of the portions of the grooves 11b of the first layer 11. By doing this, the preform 10 in the second example is manufactured. In addition, in the second injection molding unit 32, a small mold space between the ridges 11c and the cavity mold 50 or between the ridges 11d and the core mold 51 may be provided, and a thin second layer 12 may also be formed on outer surfaces of the ridges 11c and 11d. It is preferable that a thickness of the second layer 12 in the ridge 11c or 11d be less than or equal to one fourth of a thickness in the groove 11a or 11b, and it is more preferable that the thickness of the second layer 12 in the ridge 11c or 11d be less than or equal to one fifth of the thickness in the groove 11a or 11b.

Note that FIG. 5C illustrates a vertical cross section in a position where the grooves 11b have been formed in the first layer 11.

(Temperature Adjusting Unit 33)

The temperature adjusting unit 33 includes a not-illustrated mold for temperature adjustment (a temperature adjusting pot or a temperature adjusting core). The temperature adjusting unit 33 accommodates the preform 10 conveyed from the second injection molding unit 32 in a mold unit in which temperature is maintained at a predetermined temperature, and therefore the temperature adjusting unit 33 makes temperature uniform or removes temperature deviation, and adjusts the temperature of the preform 10 to a temperature suitable for final blowing (for example, about 90° C. to 105° C.). In addition, the temperature adjusting unit 33 also has a function of cooling down the preform 10 in a high-temperature state after injection molding. Note that the temperature adjusting pot includes a fitting part (a position regulation part) that comes into contact with the neck mold 36a and can be fitted, and the fitting part includes a tapered part having a shape that is roughly similar to a shape of the tapered part 36a1 of the neck mold 36a.

(Blow-Molding Unit 34)

The blow-molding unit 34 performs blow-molding on the preform 10 in which temperature has been adjusted by the temperature adjusting unit 33, and manufactures the container 20.

The blow-molding unit 34 includes a mold for blow-molding that includes blow cavity molds that are a pair of split molds that correspond to a shape of the container 20, a bottom mold, and a stretching rod and an air introducing member (a blowing core, both are not illustrated). The blow-molding unit 34 performs blow-molding while stretching the preform 10. This causes the preform 10 to be shaped into a shape of the blow cavity mold, and the container 20 can be manufactured. The pair of blow cavity molds include a fitting part (a position regulation part) that comes into contact with the neck mold 36a and can be fitted, and the fitting part includes a tapered part having a shape that is roughly similar to a shape of the tapered part 36a1 of the neck mold 36a.

(Taking Out Unit 35)

The taking out unit 35 is configured to release the neck 21 of the container 20 manufactured by the blow-molding unit 34 from the neck mold 36a, and take out the container 20 to an outside of the blow-molding apparatus 30. The taking out unit 35 includes an taking out rod (a mold for taking out) that is inserted from an opening of the neck mold 36a. The taking out rod includes a fitting part (a position regulation part) that can roughly abut onto the neck mold 36*a*.

<Description of Container Manufacturing Method>

Figure 6:
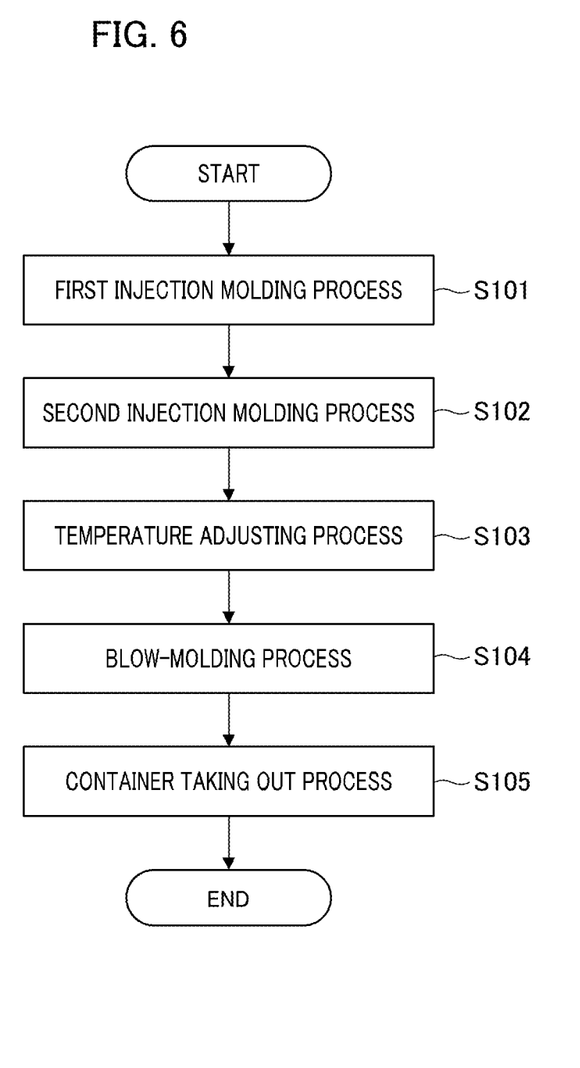
FIG. 6 is a flowchart illustrating processes of a container manufacturing method.

Next, a container manufacturing method performed by the blow-molding apparatus 30 according to the present embodiment is described. FIG. 6 is a flowchart illustrating processes of the container manufacturing method.

(Step S101: First Injection Molding Process)

First, as illustrated in FIG. 4A and FIG. 5A, in the first injection molding unit 31, the first resin material is injected from the first injection device 37 into a mold space formed by the cavity mold 40, the core mold 41, and the neck mold 36*a* of the conveyance mechanism 36, and the first layer 11 of the preform 10 is molded. In a case where the preform 10 in the first example is formed, the first injection molding unit 31*a* is used, and in a case where the preform 10 in the second example is formed, the first injection molding unit 31*b* is used.

In the first injection molding unit 31*b*, as illustrated in FIG. 5B, after the first layer 11 of the preform 10 has been molded, a process of causing the valve pin 43 to protrude to a position close to the core mold 41 is performed. By doing this, in the center of the bottom of the first layer 11, the thin film 18 having a thickness that is smaller than a thickness of a peripheral part is formed.

Then, when mold opening has been performed on the first injection molding unit 31, the transfer plate of the conveyance mechanism 36 rotates by a predetermined angle, and the first layer 11 of the preform 10 held by the neck mold 36*a* is conveyed to the second injection molding unit 32 in a state where residual heat at the time of injection molding is contained.

(Step S102: Second Injection Molding Process)

Next, the first layer 11 of the preform 10 is accommodated in the second injection molding unit 32, and the second layer 12 is injection-molded. In a case where the preform 10 in the first example is formed, the second injection molding unit 32*a* is used, and in a case where the preform 10 in the second example is formed, the second injection molding unit 32*b* is used.

In the second injection molding unit 32*a*, as illustrated in FIG. 4B, a mold space is formed between the grooves 11*a* on the outer peripheral side of the first layer 11 and the cavity mold 50 that faces the outer periphery of the first layer 11. The mold space described above is filled with the second resin material by using the hot runner mold 52.

In FIG. 4B, the core mold 51 is inserted on the inner peripheral side of the first layer 11, and the core mold 51 holds a shape of the first layer 11 from the inner peripheral side. Therefore, even if the second resin material comes into contact with the first layer 11, heat deformation of the first layer 11 can be avoided. In a case where the preform 10 in the first example is molded by doing the above, the second layer 12 can be formed on the outer peripheral side of the first layer 11.

In contrast, in the second injection molding unit 32*b*, as illustrated in FIG. 5C, a mold space is formed between the grooves 11*b* on the inner peripheral side of the first layer 11 and the core mold 51 that faces the inner periphery of the first layer 11. The mold space described above is filled with the second resin material by using the hot runner mold 52. Note that the thin film 18 has been formed in the bottom of the first layer 11. However, the thin film 18 is broken due to injection pressure of the second resin material, a hole 16 is formed in the bottom, and the second resin material is guided from the hole 16 described above to the inner peripheral side of the first layer 11.

In FIG. 5C, the cavity mold 50 faces the outer peripheral side of the first layer 11, and the cavity mold 50 holds a shape of the first layer 11 from the outer peripheral side. Therefore, even if the second resin material comes into contact with the first layer 11, heat deformation of the first layer 11 can be avoided. In a case where the preform 10 in the second example is molded by doing the above, the second layer 12 can be formed on the inner peripheral side of the first layer 11.

Note that the first layer 11 in the second injection molding process has residual heat at the time of injection molding, and is relatively easily deformable. Therefore, if the second resin material is injected into the mold space, air in the mold space is pushed out in an upward direction while slightly elastically deforming the first layer 11, and is exhausted. Thus, air accumulation is not likely to be generated at the time of molding the second layer 12, and this avoids defective molding of the preform 10.

As described above, by performing the first injection molding process and the second injection molding process, the preform 10 in the first example or the second example is manufactured.

Then, when mold opening has been performed on the second injection molding unit 32, the transfer plate of the conveyance mechanism 36 rotates by a predetermined angle, and the preform 10 held by the neck mold 36*a* is conveyed to the temperature adjusting unit 33 in a state where residual heat at the time of injection molding is contained.

(Step S103: Temperature Adjusting Process)

Next, in the temperature adjusting unit 33, the preform 10 is accommodated in a mold unit for temperature adjustment, and temperature adjusting process is performed to make the temperature of the preform 10 closer to a temperature suitable for final blowing. Then, the transfer plate of the conveyance mechanism 36 rotates by a predetermined angle, and the preform 10 after temperature adjustment that has been held by the neck mold 36*a* is conveyed to the blow-molding unit 34.

(Step S104: Blow-Molding Process)

Next, in the blow-molding unit 34, the container 20 is blow-molded.

First, mold closing is performed on the blow cavity mold to accommodate the preform 10 in mold space, and the air introducing member (the blowing core) is lowered, and therefore the air introducing member abuts onto the neck 13 of the preform 10. Then, the stretching rod is lowered, the bottom 15 of the preform 10 is pressed down from an inner face, and blowing air is supplied from the air introducing member while performing longitudinal-axis stretching as needed, and therefore lateral-axis stretching is performed on the preform 10. By doing this, the preform 10 swells out and is shaped to come into close contact with the mold space of the blow cavity mold, and the container 20 is blow-molded. Note that in a case where the preform 10 is longer than the container 20, the bottom mold is caused to stand by in a lower position that does not come into contact with the bottom of the preform 10 before mold closing of the blow cavity mold, and is quickly elevated to a molding position after mold closing.

In addition, in the present embodiment, the preform 10 in the first example or the second example is blow-molded, and therefore a container 20 having a vertical-striped pattern in which color changes in the circumferential direction according to stretching of the first layer 11 and the second layer 12 is manufactured.

(Step S105: Container Taking out Process)

When blow-molding has been finished, mold opening is performed on the blow cavity mold. This enables the container 20 to move from the blow-molding unit 34.

Next, the transfer plate of the conveyance mechanism 36 rotates by a predetermined angle, and the container 20 is conveyed to the taking out unit 35. In the taking out unit 35, the neck 21 of the container 20 is released from the neck mold 36a, and the container 20 is taken out to an outside of the blow-molding apparatus 30.

By doing the above, a single cycle of the container manufacturing method terminates. Then, by rotating the transfer plate of the conveyance mechanism 36 by a predetermined angle, the respective processes described above of S101 to S105 are repeated. Note that during the operation of the blow-molding apparatus 30, five containers are manufactured in parallel at every time difference of a single process.

In addition, for the sake of a structure of the blow-molding apparatus 30, respective time periods of the first injection molding process, the second injection molding process, the temperature adjusting process, the blow-molding process, and the container taking out process have the same length. Similarly, time periods of conveyance between the respective processes have the same length.

As described above, in the present embodiment, in the first injection molding process, a first layer 11 of a preform 10 is injection-molded, and in the second injection molding process, a second layer 12 is injection-molded in the grooves 11a or 11b on the inner peripheral side or the outer peripheral side of the first layer 11, and a preform 10 having a multilayer structure is manufacture. In the present embodiment, each of the preforms 10 having a multilayer structure is molded in two stages of injection molding, and therefore shapes and thickness distributions of the grooves 11a or 11b of the first layer 11 and the second layer 12 formed in the grooves 11a or 11b can be precisely controlled. This enables a vertical-striped pattern to be stably formed in a container 20 by performing internal coloring.

In addition, in the present embodiment, a preform 10 having a multilayer structure is manufactured in two stages of injection molding, the preform 10 is blow-molded in a state where residual heat at the time of injection molding is contained, and a container 20 is manufactured. Therefore, a device configuration of each injection molding unit or control performed on each of the injection molding units can be made simple in comparison with a case where a preform having a multilayer structure is manufactured in one injection molding, and therefore a manufacturing cost of a container can be reduced.

In addition, for example, in comparison with a case where cooled preforms are fitted, a preform having a multilayer structure is manufactured, and after reheating, blow-molding is performed (a cold parison method), in the case of the present embodiment, a preform does not need to be cooled down to a temperature close to ordinary temperature, and neither is a process of assembling or reheating the preform needed. Therefore, according to the present embodiment, a series of processes from injection molding of a preform 10 to blow-molding of a container 20 can be completed in a relatively short time, and a container 20 having a vertical-striped pattern can be manufactured in a shorter cycle.

The present invention is not limited to the embodiment described above, and various improvements and changes in design may be made without departing from the spirit of the present invention.

In the present embodiment, an example has been described where a preform 10 having a two-layer structure is molded in two stages of injection molding, and this preform 10 is blow-molded. However, in a blow-molding apparatus 30 according to the present invention, an injection molding unit may be further added, and a preform having an n-layer structure may be molded in n-stages of injection molding (where n is an integer of 3 or more). By doing this, a container having a color pattern of more complicated color arrangement can be manufactured. Note that in a case where three or more injection molding units are provided, in order to adjust the temperature of residual heat in each layer to a preferable temperature, a temperature adjusting unit may be appropriately added between the injection molding units.

Figure 7:
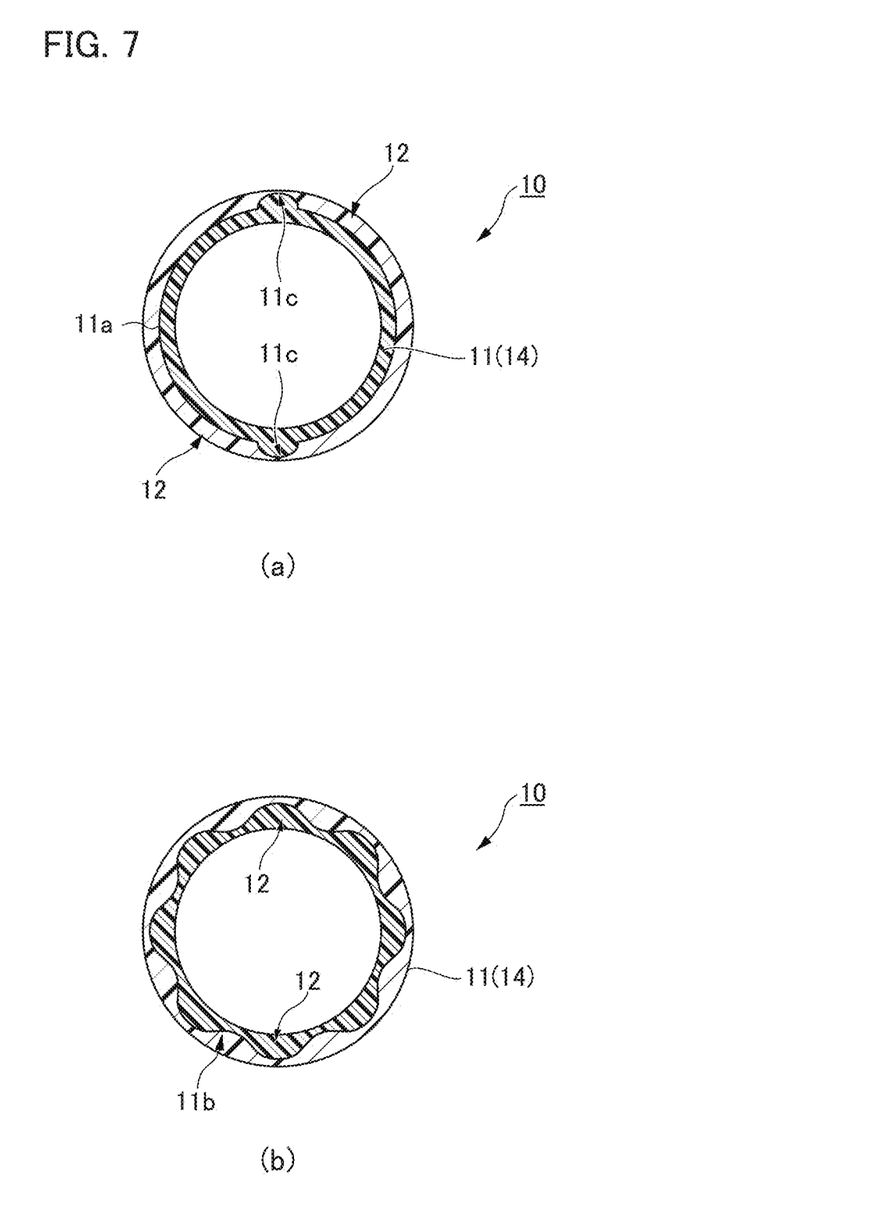
FIGS. 7A and 7B are diagrams illustrating preforms in variations of the present embodiment.

In addition, a striped pattern according to the present invention is not limited to the examples in the embodiment described above. As an example, FIG. 7A is a variation of FIG. 1B, and illustrates a transverse cross section of a preform 10 in which two grooves 11a (ridges 11c) have been formed at intervals of 1800 in the outer periphery of the first layer 11. In a case where the preform 10 of FIG. 7A has been blow-molded, a container 20 having a color pattern of two vertical stripes is formed. Note that in a case where the same type of container is formed, the grooves 11b, the ridges 11d, and the second layer 12 may be formed in the inner periphery of the first layer 11. In addition, the first layer 11 in which the ridges 11c or the grooves lib are formed is transparent (has a light transmissive property), and therefore a barrel of a container 20 that corresponds to the ridges 11c or the grooves lib also serves as a portion where a residual amount of contents can be checked.

In addition, FIG. 7B is a variation of FIG. 1D, and illustrates a transverse cross section of a preform 10 in which a depth of the groove lib changes in a curved manner in the circumferential direction. In a case where the preform 10 of FIG. 7B has been blow-molded, a periodical gradation having a vertical-striped shape can be generated in the circumferential direction of a container 20 in accordance with a change in thickness in the circumferential direction of the second layer 12. Note that in a case where the same type of container is formed, the grooves 11a and the second layer 12 may be formed in the outer periphery of the first layer 11.

Further, in FIG. 2D, the ridges 11d of the first layer may have a shape that protrudes toward a center axis of the container 20, and protruding ribs may be formed inside the container. It is preferable that the protruding ribs to be formed inside the container 20 be formed to extend at least from a lower side of the barrel 22 to an inside of the bottom 23, and the protruding ribs be provided at roughly equal intervals. By doing this, a degree of rigidity or pressure resistance of the container 20 can be enhanced.

Note that the specifications such as the number of grooves, a width of the groove, or an interval between grooves in each of the variations can be arbitrarily changed.

In addition, in the embodiment described above, a configuration example of what is called a five-station type blow-molding apparatus 30 has been described. However, a blow-molding apparatus according to the present invention may be a six-station type blow-molding apparatus that includes a temperature adjusting unit that auxiliarily heats or cools down the first layer 11 of the preform 10, between the first injection molding unit 31 and the second injection molding unit 32.

Figure 8:
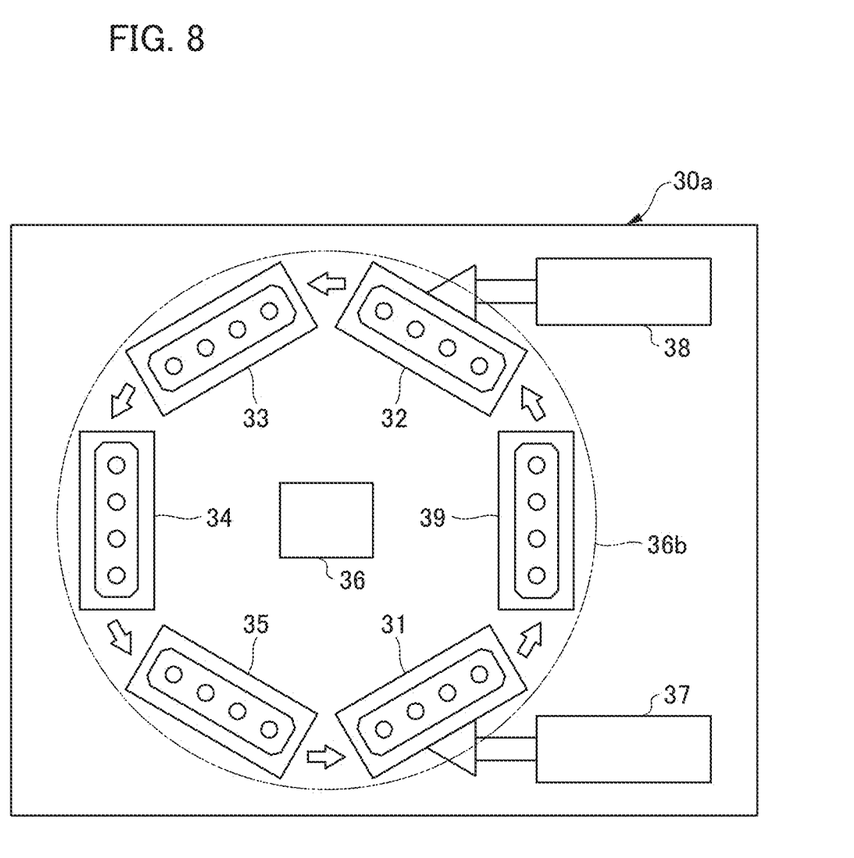
FIG. 8 is a diagram schematically illustrating a configuration of a blow-molding apparatus according to another embodiment.
Figure 9:
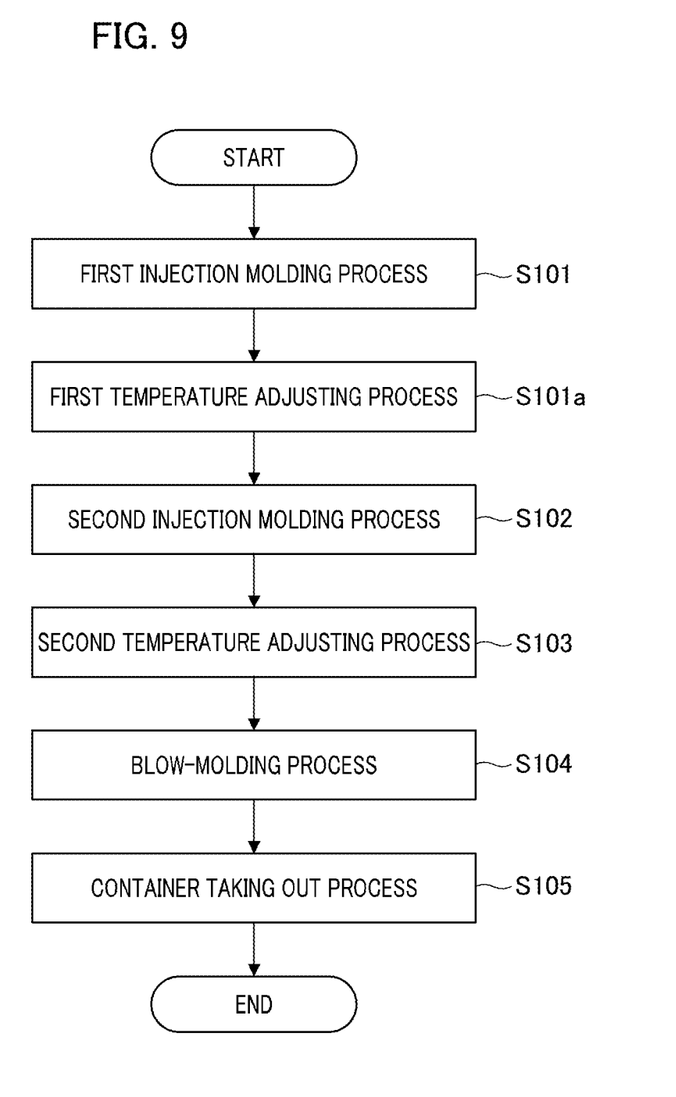
FIG. 9 is a flowchart illustrating processes of a container manufacturing method according to the other embodiment.

FIG. 8 is a diagram schematically illustrating a configuration example of a six-station type blow-molding apparatus 30a serving as another embodiment. In addition, FIG. 9 is a flowchart illustrating processes of a container manufacturing method according to the other embodiment. Note that in the description below of the other embodiment, a duplicate description relating to an element that is similar to an element of the embodiment described above is appropriately omitted.

The blow-molding apparatus 30a illustrated in FIG. 8 includes a first injection molding unit 31, a temperature adjusting unit 39 (a first temperature adjusting unit), a second injection molding unit 32, a temperature adjusting unit 33 (a second temperature adjusting unit), a blow-molding unit 34, a taking out unit 35, and a conveyance mechanism 36. The first injection molding unit 31, the temperature adjusting unit 39, the second injection molding unit 32, the temperature adjusting unit 33, the blow-molding unit 34, and the taking out unit 35 are disposed in positions that have been displaced in a rotating manner by every predetermined angle (for example, every 60 degrees) with the conveyance mechanism 36 as a center.

The conveyance mechanism 36 of the blow-molding apparatus 30a includes a transfer plate 36b that rotates about an axis in a sheet vertical direction in FIG. 8 as a center. The transfer plate 36b conveys the preform 10 (or the container 20) in which a neck is held by a neck mold to the first injection molding unit 31, the temperature adjusting unit 39, the second injection molding unit 32, the temperature adjusting unit 33, the blow-molding unit 34, and the taking out unit 35 in this order.

In addition, the temperature adjusting unit 39 has a configuration that is roughly similar to a configuration of the temperature adjusting unit 33, and includes a not-illustrated mold for temperature adjustment (a temperature adjusting pot or a temperature adjusting core). The temperature adjusting unit 39 accommodates the first layer 11 of the preform 10 conveyed from the first injection molding unit 32 in a mold unit that is maintained at a predetermined temperature, and therefore the temperature adjusting unit 39 auxiliarily heats or cools down the first layer 11.

As illustrated in FIG. 9, a container manufacturing method performed by the blow-molding apparatus 30a according to the other embodiment is different from the manufacturing method according to the embodiment described above illustrated in FIG. 6 in that a first temperature adjusting process (S101a) is performed between the first injection molding process (S101) and the second injection molding process (S102).

In the first temperature adjusting process (S101a), in the temperature adjusting unit 39, the first layer 11 of the preform 10 is accommodated in the mold unit for temperature adjustment, the first layer 11 is cooled down, and a temperature distribution is adjusted (temperature is made uniform, or temperature deviation is removed). At this time, in the temperature adjusting unit 39, the first layer 11 may be heated as needed.

Then, the transfer plate 36b of the conveyance mechanism 36 rotates by a predetermined angle, and the first layer 11 of the preform 10 held by the neck mold is conveyed to the second injection molding unit 33. Note that the other processes in FIG. 9 are similar to processes in FIG. 6.

In addition, it is to be considered that the embodiments disclosed herein are exemplary, and are not restrictive in all points. The scope of the present invention is specified by the claims rather than the description above, and is intended to include all changes without departing from equivalent meaning and scope of the claims.

The invention claimed is:

1. A manufacturing method of a resin container, the manufacturing method comprising:
   a first injection molding process for injection-molding a first layer of a preform by using a first resin material, the first layer of the preform having a bottomed cylindrical shape and including a groove that extends in an axis direction;
   a second injection molding process for injecting a second resin material into the groove of the first layer, the second resin material having a color that is different from a color of the first resin material, and laminating a second layer on an inner peripheral side of the first layer; and
   a blow-molding process for blow-molding a preform that includes multiple layers and has been obtained in the second injection molding process in a state where residual heat at a time of injection molding is contained, and manufacturing the resin container having a vertical-striped color pattern formed by using the second layer,
   wherein, in the first injection molding process, a first core mold having a groove formed therein is used to form the groove on the inner peripheral side of the first layer, and
   in the second injection molding process, a cavity mold that holds a shape of the first layer is disposed on the outer peripheral side of the first layer, and the second resin material is injected between a second core mold that is different from the first core mold and the groove of the first layer.

2. The manufacturing method of the resin container according to claim 1, wherein
   in the first injection molding process, a thin film having a small thickness is formed in a portion of the first layer, and
   in the second injection molding process, the thin film is broken by injecting the second resin material, and the second resin material is guided to the inner peripheral side of the first layer.

3. The manufacturing method of the resin container according to claim 1, wherein
   the first resin material and the second resin material are resin materials that have different compositions of colorant and are of an identical type.

4. A manufacturing apparatus of a resin container, the manufacturing apparatus comprising:
   a first injection molding unit configured to injection-molds a first layer of a preform by using a first resin material, the first layer of the preform having a bottomed cylindrical shape and including a groove that extends in an axis direction;
   a second injection molding unit configured to inject a second resin material into the groove of the first layer, the second resin material having a color that is different from a color of the first resin material, and laminate a second layer on an inner peripheral side of the first layer; and
   a blow-molding unit configured to blow-mold a preform that includes multiple layers and has been obtained in the second injection molding unit in a state where residual heat at a time of injection molding is contained, and manufactures the resin container having a vertical-striped color pattern formed by using the second layer, wherein, the first injection molding unit uses a first core mold having a groove formed therein to form the groove on the inner peripheral side of the first layer, and the second injection molding unit disposes a cavity mold that holds a shape of the first layer on the outer peripheral side of the first layer, and injects the second resin material between a second core mold that is different from the first core mold and the groove of the first layer.

* * * * *